May 21, 1968   J. S. ARNOLD ETAL   3,384,767

ULTRASONIC TRANSDUCER

Filed May 11, 1964

INVENTOR.
JAMES S. ARNOLD
VINCENT SALMON
BY Samuel Lindenberg
ATTORNEY

United States Patent Office 3,384,767
Patented May 21, 1968

3,384,767
ULTRASONIC TRANSDUCER
James S. Arnold, Palo Alto, and Vincent Salmon, Menlo Park, Calif., assignors to Stanford Research Institute, Menlo Park, Calif., a corporation of California
Filed May 11, 1964, Ser. No. 366,296
3 Claims. (Cl. 310—8.5)

This invention relates to transducers which are employed for evaluating a bond between materials which are fastened together, and more particularly to an improved method and means for exciting such a transducer.

Extensive use is being made of adhesives in the bonding of materials, such as wood, plastic, and metals to improve the structural characteristics of the materials being bonded. It will be appreciated that it is important to determine how good a bond is, before a bonded assembly is used. Such determination has often been made by destructive tests on adhesive bonded samples that were intended to be representative of the product. This method of testing leaves something to be desired, since the samples tested may or may not be representative of the product, depending upon the sampling technique employed and the degree of production control.

Another method for testing structural bonds is one which applies an electromechanical transducer (directly or through a coupling medium) to one surface of the structural material. Electrical oscillations are applied to said transducer which converts these into mechanical oscillations. These are applied to the structural material. Two methods for detecting the quality of the bond may then be employed. One of these measures the amplitude of the waves that are transmitted through the material, as detected by another electromechanical transducer which is in contact with an opposing surface of the structural material. The electrical output of this transducer is amplified and displayed for evaluation. A second method measures the change in electrical impedance of the driving electromechanical transducer; this impedance changes as the quality of the bond varies.

This invention is directed to improvements in transducers for structural bond evaluation employing the transmitted wave technique to indicate the quality of that bond. In a preferred embodiment the transducer is made in the form of a right circular cylinder. Such a cylinder may be caused to vibrate in a predominantly radial mode. See U.S. Patent 3,016,735. The manner of exciting these transducers in the radial mode is to connect an electrical oscillation generator to properly arranged electrodes on the transducer. It has been found that with certain arrangements of electrodes the transducer will then vibrate radially in a predominantly radial mode. Difficulties are encountered, however, in causing the electromechanical transducer to oscillate radially to any usable degree when the transducer is driven at frequencies which are relatively high when compared to the frequency of the fundamental mode. It is often desirable to drive the transducer at much higher frequencies because of directionality characteristics, as well as the fact that with certain types of bonded structures a better indication of bond integrity is obtained when the high frequencies are used.

It is an object of this invention to excite an electromechanical transducer of the type described in a manner to produce usable high frequency oscillations, by exciting it in a high frequency predominantly radial mode.

Another object of this present invention is the provision of an arrangement for driving an electromechanical transducer of the type described so that it vibrates in a higher mode of oscillation more efficiently than has been achieved heretofore.

Yet another object of the present invention is the provision of a novel and useful arrangement of electrodes over the surface of a transducer for the purpose of efficiently driving it in its higher frequency radial modes.

These and other objects of the invention may be achieved by the manner in which the exciting voltage is applied to the transducer so that it will vibrate in a desired mode at a frequency that is higher than that of the fundamental mode. In a preferred embodiment this is accomplished by employing concentrically disposed circular electrodes, on the plane faces of the cylindrical transducer, and which are connected together in a predetermined manner to the driving electrical oscillation source. The number and disposition of the electrodes is uniquely determined by the radial mode desired.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figure 1:
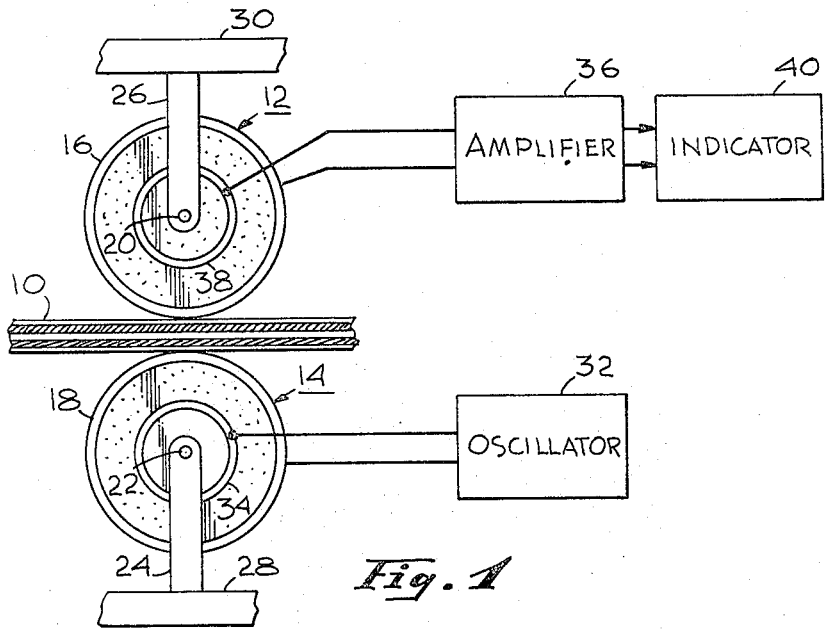
FIGURE 1 is a drawing illustrating the use of roller electromechanical transducers for the purpose of evaluating a bond in structural material; wherein electrodes are arranged so that the transducers are driven to vibrate radially.

Referring now to FIGURE 1, a structural material 10, such as plywood, comprises several layers of thin sheets of wood which are bonded together by some suitable bonding material. In order to test the bond, a pair of transducers 12, 14 may be employed. These transducers are of the electromechanical type and may be made for example of a cylinder of barium titanate having an elastomeric material, such as rubber 16, 18 around the periphery thereof for the purpose of transmitting or receiving mechanical vibrations. These transducers are mounted by any suitable means to be rotatable. The arrangement shown in the drawing is merely by way of illustration and is not to be construed as a limitation upon the invention. In the drawing, each one of the transducers 12, 14 may be suitably supported on an axle respectively 20, 22, which in turn is journaled rotatably and supported by axle holding members respectively, 24, 26. These axle holding members in turn may be attached to any suitable support mechanism respectively 28, 30, which are shown in fragmentary form, since these are no part of this invention. The purpose of the support mechanisms may be either to enable the rolling transducers to be rolled over the surface of the structural material 10 to afford test of an area, or, these transducers may be supported and the structural material may be passed through them for the purpose of producing an evaluation. In order to eliminate the need for multiple passes of broad sheets of material through a single pair of opposed transducers, an array of transducers may be employed through which a sheet of structural material is passed once for a bond evaluation.

For bond evaluation, an oscillator 32 applies its output to a pair of electrodes 34, only one of which is shown in the drawing. This causes the electromechanical transducer to vibrate radially and these vibrations are communicated to the structural material 10. The receiving transducer 12 receives these vibrations from the structural material and in response thereto generates electrical signals. These signals are received from the transducer by an amplifier 36 which is connected to the electrodes 38 (only one of which is shown) which are mounted on opposite sides of the transducer. The output of the amplifier is applied to a suitable indicator 40. The display of the indicator is normally compared with the results obtained from previous bond evaluations which enable a determination that the indication is that of a good or bad bond.

As previously pointed out, the practice heretofore has been to use a single pair of electrodes on opposite sides of a transducer made of a ferroelectric material, for example, to produce vibration at the fundamental mode frequency. Although an exact analytical description of the vibration modes of short solid cylinders has not been formulated, it has been found experimentally that the radial vibration behavior of such a cylinder can be described to a first approximation as being similar to that of a membrane. The theory of the vibration of a membrane with a circular boundary, as developed by Rayleigh and others, indicates that the overtone vibration modes are defined by nodal circles on the membrane, the position of which are determined by the roots of the Bessel's function appropriate to the geometry and boundary conditions. In the case of a cylindrical transducer of the type which is employed in accordance with this invention, the motion under vibration is a composite of both axial and radial components. The driving force is developed in the axial direction by the interaction of an applied electric field with the internal polarization of materials. The coupling that exists in the solid causes radial motion as one response to the driving force, and the resonance of lowest frequency occurs when the radiuc of the cylinder is about ¼ wavelength. If $r_{1, 2, 3 \ldots n}$ are the radii of nodal circles on the flat surface of the disc, $r$ its radius and $X_{1, 2, 3 \ldots n}$ the roots of the Bessel's function of zero order $J_0(X)$, the values of $r_n$ can be found from the relation $$r_{(1, 2, 3 \ldots n-1)} = \frac{X_{(1, 2, 3 \ldots n-1)}}{X_n} \cdot r$$

Figure 2:
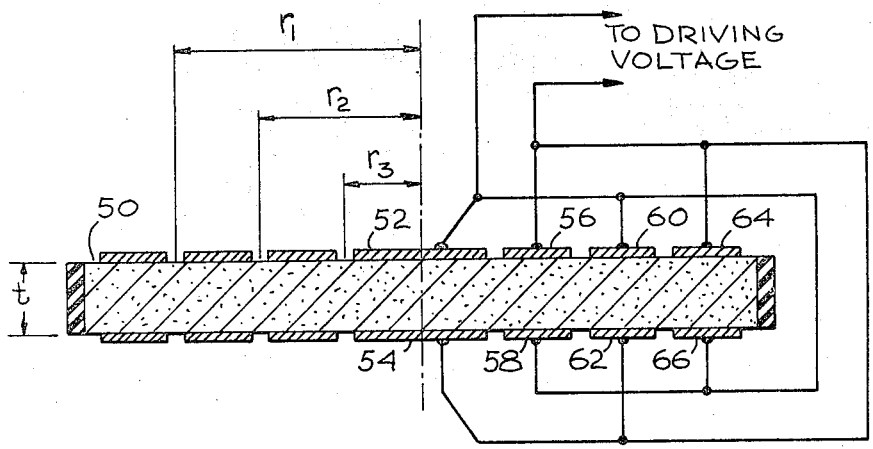
FIGURE 2 is a cross-section of a transducer, having an electrode disposition in accordance with this invention.
Figure 3:
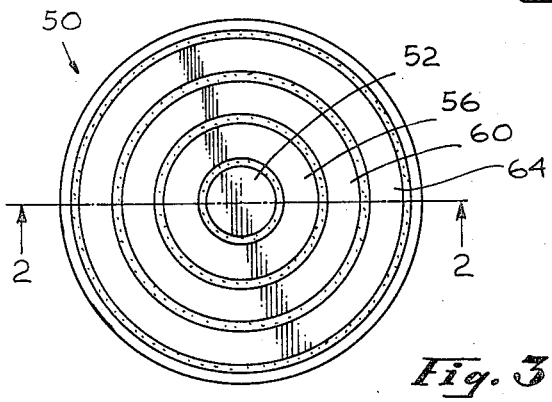
FIGURE 3 is a plan view of a transducer in accordance with this invention showing the electrode disposition.

To excite a given overtone (the $(n-1)$th) in a disc of radius $r$, the above equation is solved for the $(n-1)$ values of $r_{(1, 2, 3 \ldots n-1)}$, and driving electrodes are applied to the disc in the regions between the nodal circles, as shown in FIGURE 2. FIGURE 2 is a cross-section of an electromechanical transducer of the type shown in FIGURE 1, however, with an electrode disposition to enable the transducer to be driven in its third overtone mode. FIGURE 3 is a view of one side of the transducer shown in FIGURE 2.

The basic transducer 50, may be made of a ferroelectric material, such as barium titanate. In accordance with this invention, electrodes are disposed on the opposite flat surface of the transducer 50, and, as indicated, are applied to the disc in the regions between the nodal circles which are shown in FIGURE 2, and have radii $r_{1, 2, 3}$. There are provided opposed central electrodes respectively 52, 54, and three concentrically disposed ring electrodes, respectively, 56, 58, 60, 62, 64, 66. The alternate electrodes on the upper and lower surfaces of the transducer are connected together and then are connected to the source of driving voltage. For example, electrodes 52, 60, 66 and 58 are connected together and alternate electrodes 56, 64, and 62 and 54 are connected together. It should be apparent that for receiving vibrations at the same higher modes, the disposition of electrodes over the surfaces of the receiving transducer should be substantially identical with the disposition of electrodes over the surface of the transmitting transducer.

When the electrodes on the transducer are connected as shown and an oscillator of the proper frequency is connected to the electrodes, stable mechanical oscillations in the desired mode are produced. If it is desired to use the transducer in a self-excited oscillator circuit, as shown in Patent 3,016,735, by J. S. Arnold and Joseph A. Kochly, then a small isolated feedback electrode is required at the center of the disc.

Using the techniques described hereinabove, namely, calculating the locations of the nodal circles and by applying ring electrodes to the locations therebetween, and further, by connecting the electrodes in alternate fashion in the manner indicated, a disc of barium titanate, which was ½″ thick and 4″ in diameter, was made to oscillate in several radial modes with different configurations of electrodes. The lowest frequency radial mode for the disc was about 32 kc. The highest overtone attempted was the seventh overtone which has a frequency of 521 kc. Strong stable oscillation was obtained at this frequency. A disc of ⅜″ thickness and 2″ diameter (lowest frequency radial mode about 65 kc.) was also excited in the seventh overtone mode with suitable electrodes, and produced stable oscillations at 1270 kc.

The value of the radial overtone excitation lies in the fact that the development of relatively high frequencies (hundreds of kilocycles) can be accomplished in transducers that are large enough to be used as rolling search transducers in ultrasonic nondestructive testing. The high frequency capability increases the resolution that can be obtained and generally extends the range of situations in which said testing is useful.

There has accordingly been described and shown hereinabove a novel, useful electrode disposition for enabling the excitation of electromechanical transducers in vibration modes which are otherwise not attainable.

What is claimed is:

1. In an electromechanical transducer of the type having a solid cylindrical shape and having electrodes disposed on opposite flat surfaces thereof for enabling excitation in a radial vibration mode, the improvement comprising a plurality of electrodes disposed on opposite surfaces of said transducer, said electrodes being concentrically disposed and covering all of the opposed surfaces of said transducer except predetermined nodal circular regions on said opposite surfaces, means connecting alternate ones of said electrodes which are not opposite one another on said opposed surfaces together, means for connecting the remaining ones of said electrodes on opposed surfaces of said surfaces, and means for applying a driving signal to said connected electrodes.

2. An improved electromechanical transducer of the cylindrical type comprising a cylinder of material having electromechanical properties, and means for driving said cylinder electrically at a mode which is multiple of the fundamental mode, comprising a pair of opposed central electrodes disposed on opposite flat surfaces of said cylinder, and concentric ring electrodes disposed over the remainder of the opposed flat surfaces of said cylinder, said central electrodes and concentric electrodes covering all of said cylinder surface except predetermined nodal regions at the desired mode of excitation, means connecting together alternate ones of said electrodes connecting with the said central electrode on one surface and extending thereover and around to the opposite surface, and means connecting together the remaining ones of the electrodes commencing with said one surface and extending around to the opposite surface.

3. Means for driving a cylindrical transducer in a vibration mode which is higher than the fundamental mode of vibration of the transducers at resonance comprising a first and second electrode disposed on opposite sides of a said transducer over the center thereof, and a plurality of concentric ring electrodes on opposite surfaces of said cylindrical transducer, said central electrodes and concentric ring electrodes covering all of said surfaces except predetermined nodal circuit regions of said surfaces in accordance with the desired predetermined mode of excitation, means connecting alternate ones of said electrodes together commencing with the central electrode on one surface and extending around to the other surface, and means for connecting the remaining ones of said electrodes together.

References Cited

UNITED STATES PATENTS

| 3,018,451 | 1/1962 | Mattiat | 310—9.8 |
| 2,969,512 | 1/1961 | Jaffe | 310—9.7 |
| 2,943,278 | 6/1960 | Mattiat | 310—8.1 |
| 3,148,290 | 9/1964 | Dranetz | 310—9.6 |
| 2,875,355 | 2/1959 | Petermann | 310—9.5 |
| 3,494,849 | 12/1963 | Poschenrieder | 310—9.6 |

MILTON O. HIRSHFIELD, *Primary Examiner.*

J. D. MILLER, *Examiner.*